United States Patent
Gutha et al.

(10) Patent No.: US 8,532,797 B2
(45) Date of Patent: Sep. 10, 2013

(54) MECHANISM FOR CONSTRUCTING GENERIC CONTROL LOGIC INCLUDING VERSIONS IN VARIOUS PROTOCOLS

(75) Inventors: Stalin Gutha, Bangalore (IN); Janaki Krishnaswamy, Bangalore (IN); Lavanya Bhadriraju, Bangalore (IN); Ankur Jhawar, Bangalore (IN); Kevin B. Moore, Chaska, MN (US)

(73) Assignee: Honeywell International Inc., Morristown, NJ (US)

( * ) Notice: Subject to any disclaimer, the term of this patent is extended or adjusted under 35 U.S.C. 154(b) by 603 days.

(21) Appl. No.: 12/650,447

(22) Filed: Dec. 30, 2009

(65) Prior Publication Data

US 2011/0160878 A1 Jun. 30, 2011

(51) Int. Cl.
*G05B 15/00* (2006.01)

(52) U.S. Cl.
USPC ............... 700/83; 700/96; 700/97; 700/181; 700/86; 700/87; 700/20; 700/17

(58) Field of Classification Search
None
See application file for complete search history.

(56) References Cited

U.S. PATENT DOCUMENTS

| | | | | |
|---|---|---|---|---|
| 5,469,361 | A * | 11/1995 | Moyne | 700/95 |
| 5,828,851 | A * | 10/1998 | Nixon et al. | 710/105 |
| 6,266,726 | B1 * | 7/2001 | Nixon et al. | 710/105 |
| 6,453,687 | B2 * | 9/2002 | Sharood et al. | 62/127 |
| 6,785,730 | B1 * | 8/2004 | Taylor | 709/230 |
| 6,832,120 | B1 * | 12/2004 | Frank et al. | 700/65 |
| 7,370,074 | B2 * | 5/2008 | Alexander et al. | 709/203 |
| 7,725,205 | B1 * | 5/2010 | Krebs | 700/96 |
| 7,882,256 | B2 * | 2/2011 | Murakami et al. | 709/230 |
| 7,904,186 | B2 * | 3/2011 | Mairs et al. | 700/83 |
| 7,917,232 | B2 * | 3/2011 | McCoy et al. | 700/17 |
| 8,024,054 | B2 * | 9/2011 | Mairs et al. | 700/83 |
| 8,050,801 | B2 * | 11/2011 | Richards et al. | 700/276 |
| 8,055,386 | B2 * | 11/2011 | McCoy et al. | 700/276 |
| 8,055,387 | B2 * | 11/2011 | McCoy et al. | 700/276 |
| 8,060,222 | B2 * | 11/2011 | Eldridge et al. | 700/83 |
| 8,099,178 | B2 * | 1/2012 | Mairs et al. | 700/19 |
| 8,121,882 | B2 * | 2/2012 | Zayic | 705/7.26 |
| 8,132,127 | B2 * | 3/2012 | Baier et al. | 715/866 |
| 8,185,871 | B2 * | 5/2012 | Nixon et al. | 717/121 |
| 2004/0260431 | A1 * | 12/2004 | Keenan et al. | 700/295 |
| 2005/0230490 | A1 | 10/2005 | Pouchak et al. | |
| 2006/0067341 | A1 * | 3/2006 | Barber et al. | 370/401 |
| 2008/0004754 | A1 | 1/2008 | Pouchak et al. | |

(Continued)

OTHER PUBLICATIONS

Honeywell Spyder Bacnet User's Guide, 242 pages, Revised Jul. 2009.

(Continued)

*Primary Examiner* — Kavita Padmanabhan
*Assistant Examiner* — Christopher E Everett
(74) *Attorney, Agent, or Firm* — Seager Tufte & Wickhem LLC

(57) ABSTRACT

A mechanism for constructing generic control logic with versions of the logic automatically generated and stored for one or more protocols. The complexity of the one or more protocols may be hidden under a hood of the mechanism from the view of engineers, programmers and users so as to improve their productivity relative to control logic designs and applications.

18 Claims, 7 Drawing Sheets

(56) References Cited

U.S. PATENT DOCUMENTS

| | | |
|---|---|---|
| 2008/0010049 A1 | 1/2008 | Pouchak et al. |
| 2008/0015739 A1 | 1/2008 | Wacker |
| 2008/0016493 A1 | 1/2008 | Pouchak et al. |
| 2008/0115153 A1 | 5/2008 | Brindle |
| 2008/0125914 A1 | 5/2008 | Wacker |
| 2009/0077044 A1* | 3/2009 | Krishnaswamy et al. ........ 707/3 |
| 2009/0113037 A1 | 4/2009 | Pouchak |
| 2010/0100583 A1 | 4/2010 | Pouchak |

OTHER PUBLICATIONS

Honeywell Spyder User's Guide 202 pages, Released Jul. 2007.
Siemens, BACnet for DESIGO 27 Pages, prior to Dec. 30, 2009.

* cited by examiner

MECHANISM FOR CONSTRUCTING GENERIC CONTROL LOGIC INCLUDING VERSIONS IN VARIOUS PROTOCOLS

RELATED APPLICATIONS

Related co-pending applications include application Ser. No. 12/650,385, filed Dec. 30, 2009, entitled "A Graphical Approach to Setup Data Sharing between Two Controllers"; application Ser. No. 12/650,467, filed Dec. 30, 2009, entitled "Protocol Independent Programming Environment"; application Ser. No. 12/650,476, filed Dec. 30, 2009, entitled "Priority Selection Mechanism for Driving Outputs from Control Logic for Controllers of Various Protocols"; application Ser. No. 12/650,485, filed Dec. 30, 2009, entitled "An Approach to Automatically Encode Application Enumeration Values to Enable Reuse of Applications across Various Controllers"; application Ser. No. 12/650,497, filed Dec. 30, 2009, entitled "An Approach for Switching between Point Types without Affecting Control Logic"; and application Ser. No. 12/650,513, filed Dec. 30, 2009, entitled "Changeable BACnet Interface".

Related co-pending applications include application Ser. No. 12/650,385, filed Dec. 30, 2009, entitled "A Graphical Approach to Setup Data Sharing between Two Controllers", is hereby incorporated by reference. Application Ser. No. 12/650,467, filed Dec. 30, 2009, entitled "Protocol Independent Programming Environment", is hereby incorporated by reference. Application Ser. No. 12/650,476, filed Dec. 30, 2009, entitled "Priority Selection Mechanism for Driving Outputs from Control Logic for Controllers of Various Protocols", is hereby incorporated by reference. Application Ser. No. 12/650,485, filed Dec. 30, 2009, entitled "An Approach to Automatically Encode Application Enumeration Values to Enable Reuse of Applications across Various Controllers", is hereby incorporated by reference. Application Ser. No. 12/650,497, filed Dec. 30, 2009, entitled "An Approach for Switching between Point Types without Affecting Control Logic", is hereby incorporated by reference. Application Ser. No. 12/650,513, filed Dec. 30, 2009, entitled "Changeable BACnet Interface", is hereby incorporated by reference.

BACKGROUND

The invention pertains to programming and particularly to various communication protocols of applications. More particularly, the invention pertains to knowledge of numerous protocols needed by application engineers.

SUMMARY

The invention is a mechanism for minimization or elimination of a need by application design engineers to have knowledge of one or more protocols while designing control logic applications. The mechanism may provide generic control logic applications that have versions automatically made to be used in controllers of various protocols.

DESCRIPTION

Programming tools used by HVAC (heating, ventilation and air conditioning) application engineers may be quite complex and often expose details of the underlying communication protocols to users. This may force the application engineers to be protocol experts apart from being HVAC experts. This is not necessarily practical for an application engineer as there may be several communication protocols used in HVAC automation. Some protocols may involve those of LonTalk™ (LonTalk, Lon™, Lon), LonWorks™ (LonWorks), and BACnet (Bacnet). LonTalk and Lon are trademarks of Echelon Corp. BACnet is a communications protocol for building automation and control networks.

A Spyder™ (Spyder) programming tool may support programming of Lon Spyder controllers. Spyder is a trademark of Honeywell International Inc. Often, users may need to create the same control application twice, one for Lon Spyder and one for BACnet Spyder which can be time consuming and prone to mistakes. The applications may need to be replicated for the Lon and BACnet versions. Also, any small changes to a Lon application may need to be replicated in the BACnet version of the application.

The Spyder tool may have an application library that is used to create, modify and store Spyder applications for later use. This tool may allow engineers to design a generic application feature in the application library. When a user creates an application, the tool may automatically generate two network interface views (e.g., Lon and BACnet). The user may simply add points on the wire sheet, and tool can automatically create corresponding backend Lon network variables and BACnet objects. This way, one may keep applications generic for Lon and BACnet versions of the applications, and thus applications need not be replicated and any changes to the application may be reflected in both Lon and BACnet versions of the application.

A generic application may improve productivity of field engineers and keep the complexity of communication protocol hidden under the hoods of the system. Figures noted herein show steps that an engineer may go through to create generic applications reusable with various protocols. When an engineer drops a data point in the tool for the purpose of using it in the control logic, the tool may automatically create an underlying protocol object and maintain a mapping/reference between the point and the protocol object. The tool may maintain a reference for every protocol supported; that is, since Lon and BACnet are supported, the tool may maintain two references for every data point dropped by the user into the control logic. This approach may allow the tool to do automatic translation when the control logic is used in a target Spyder device.

Figure 1:
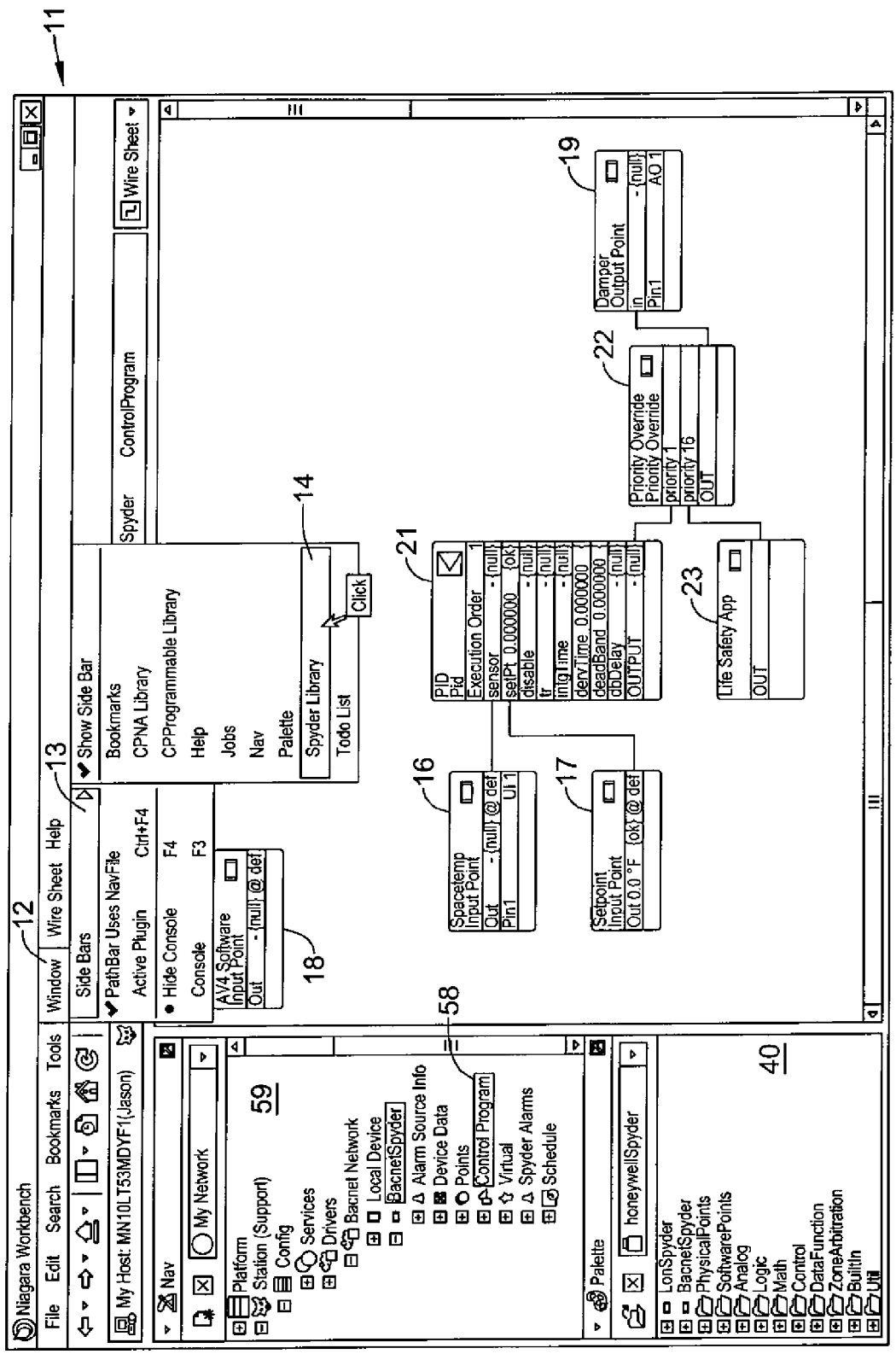
FIG. 1 is a diagram of a workbench for opening an application library.
Figure 2:
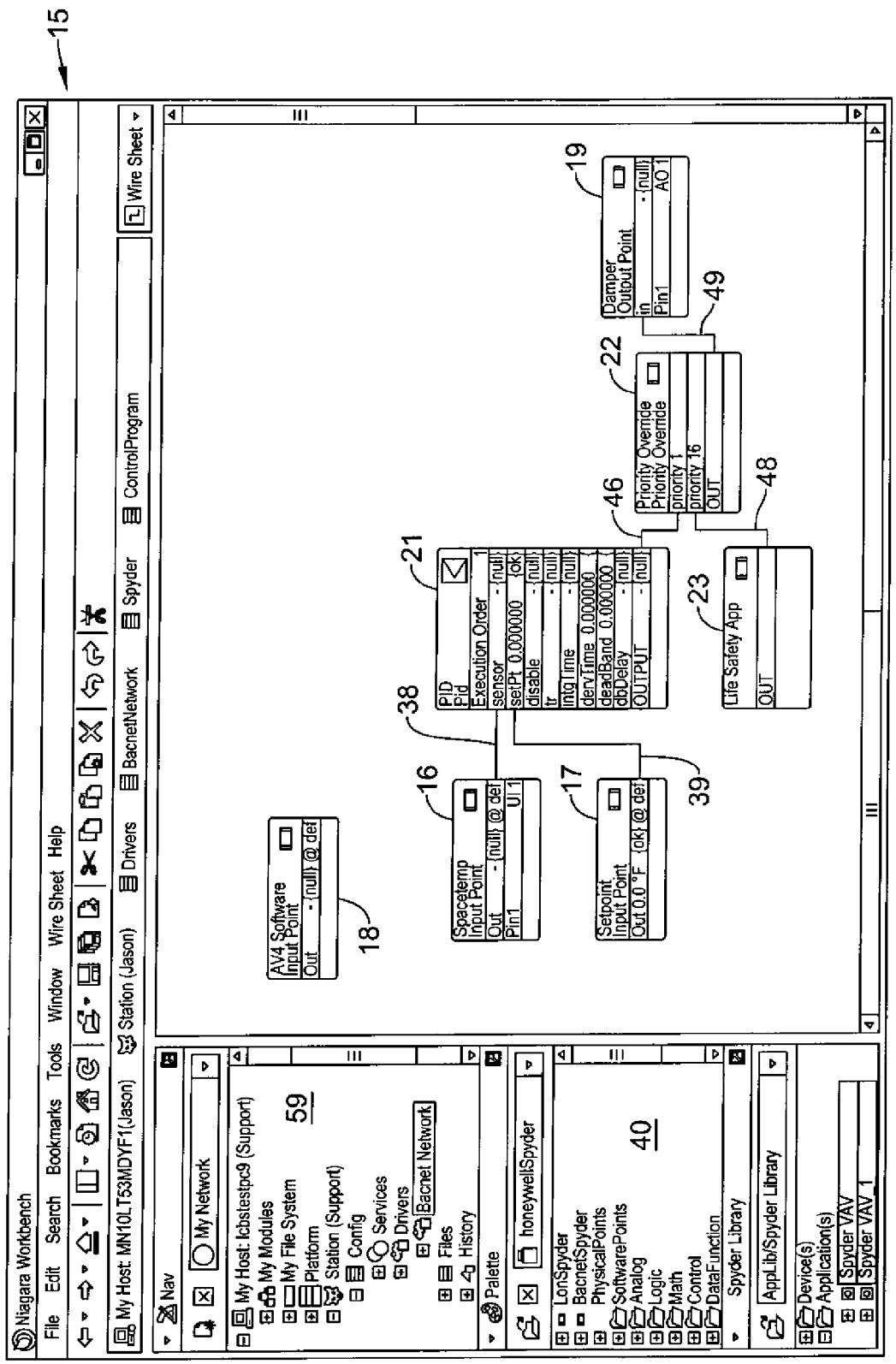
FIG. 2 is a diagram of control logic with data points and function blocks.

The present approach may concern creating generic control applications for Spyder. The first step may be an opening the Spyder application library. This may be achieved by clicking on "window" 12 of a Niagara workbench as shown by screen 11 of FIG. 1. "Side Bars" 13 may be clicked on to show a drop-down menu with "Spyder Library" 14 listed. "Spyder Library" 14 may be clicked on to open a Spyder application library. A control program 58 may be shown as indicated by a Nav (navigation) palette 59 menu. As a second step, control logic may be created by using data points and function blocks as shown by screens 11 and 15 of FIGS. 1 and 2, respectively. As examples for an illustration, input points may include space temp 16, set point 17, AV4 Software 18 and an output point 19 for a damper. Function blocks may include PID 21, priority override 22 and life safety app 23. The Figures may also relate to VAV (variable air volume) aspects.

The space temp input point 16 may be connected to function block 21 with a link 38. Setpoint input point 17 may be connected to function block 21 with a link 39. An output of the PID (proportional-integral-derivative) function block 21 may be connected to an input of priority override 22 with a link 46 and life safety app may be connected to another input of priority override 22 with a link 48. An output of priority override 22 may be connected to damper output point 19.

Figure 3:
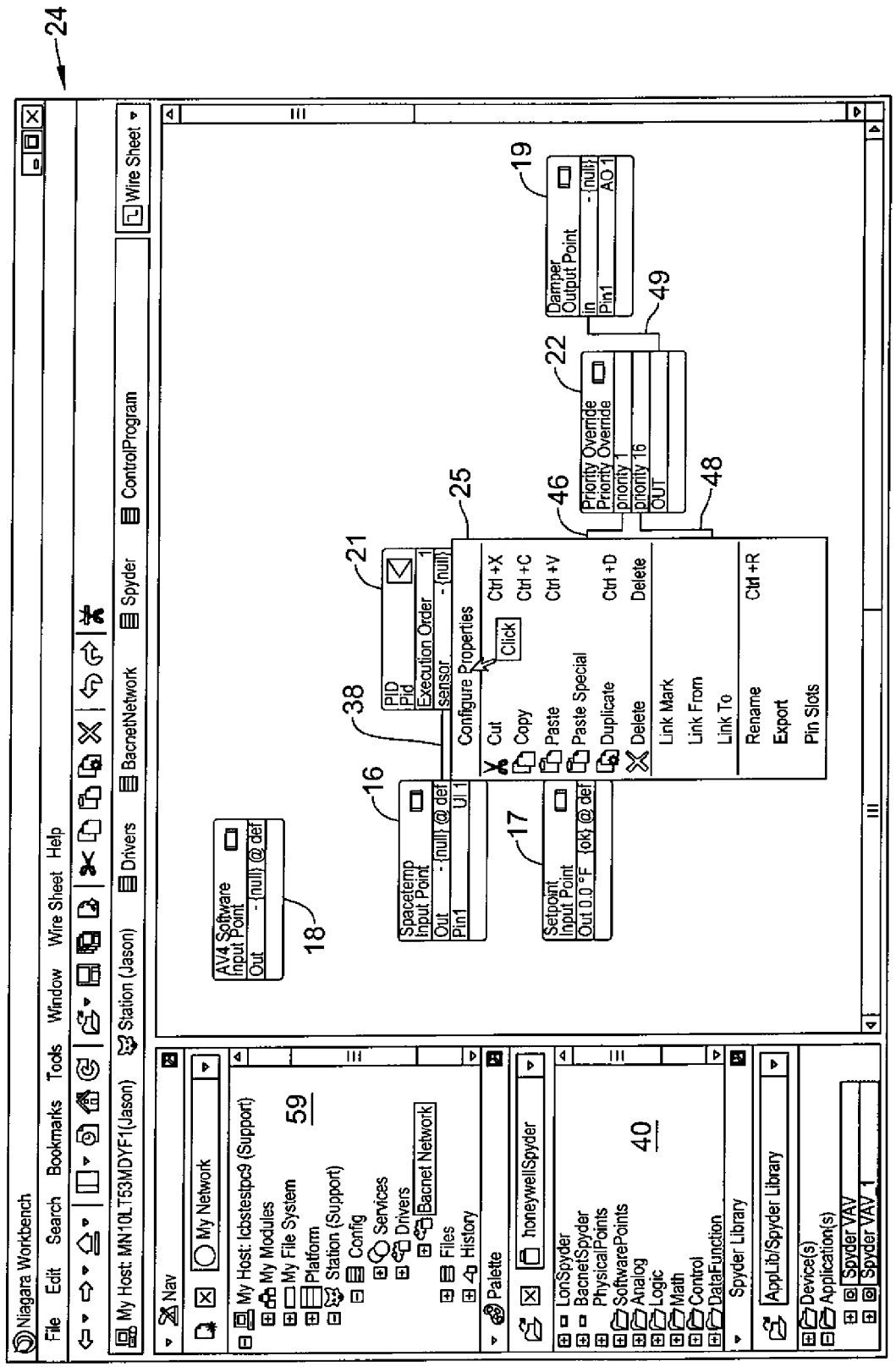
FIG. 3 is a diagram of the workbench for invoking a configuration of a data point.
Figure 4:
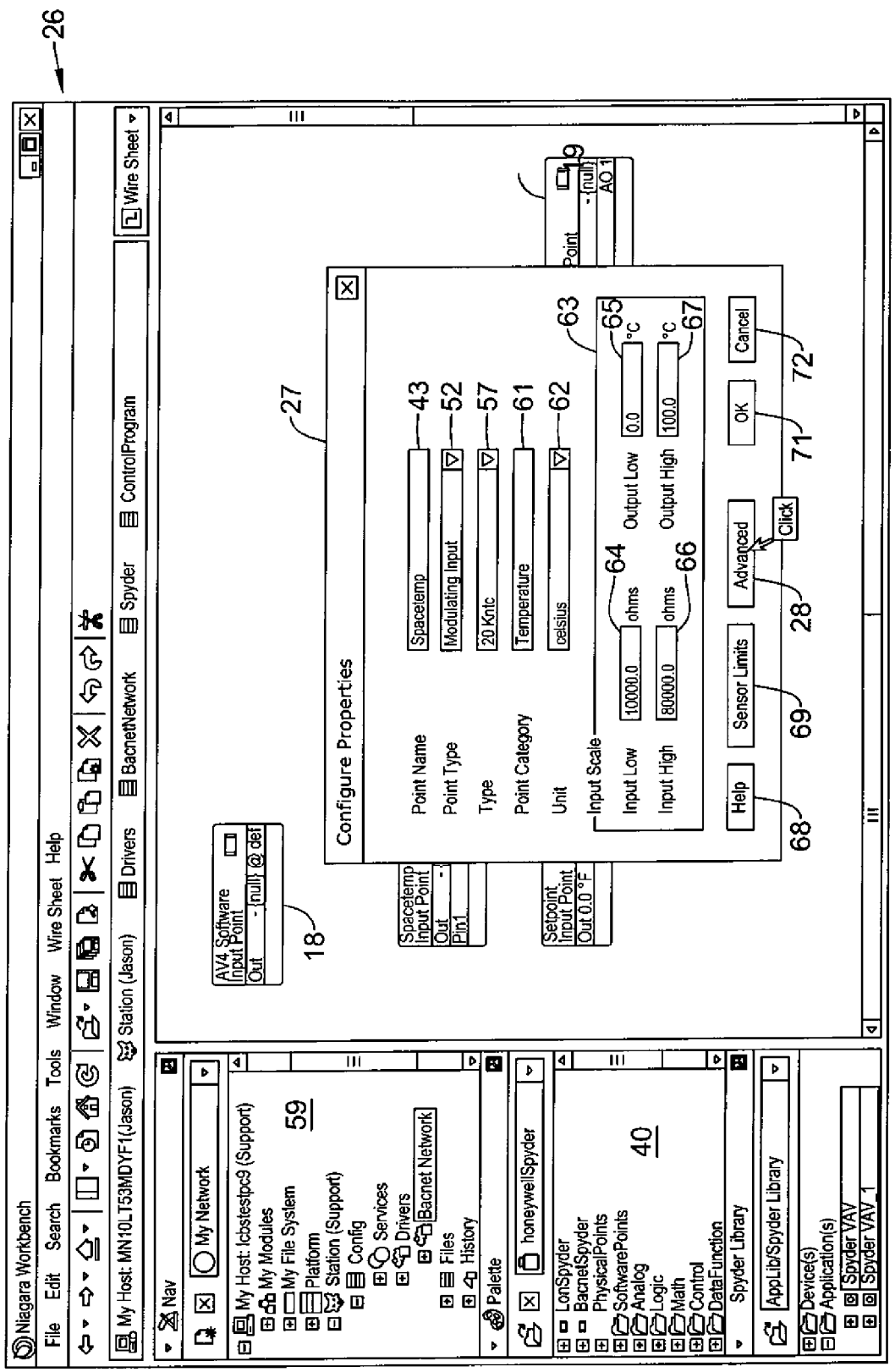
FIG. 4 is a diagram of the workbench for configuring general properties of the data point.

A third step may invoke a configuration screen or menu 25 of the space temperature data point 16 by clicking on data point 16. This step and resulting menu 25 are shown by screen 24 of FIG. 3. "Configure Properties" of menu or screen 25 may be clicked on to get a dialog box or screen 27 for configuring general properties of data point 16, as a fourth step shown by screen 26 of FIG. 4. The properties may include point name 43, point type 52, type 57, point category 61 and unit 62. Input state box 63 may have entries spaces 64, 65, 66 and 67 for input low, output low, input high and output high, respectively. Box 27 may include a "Help" button 68, "Sensor Limits" button 69, "Advanced" button 28, "OK" button 71 and "Cancel" button 72.

Figure 5:
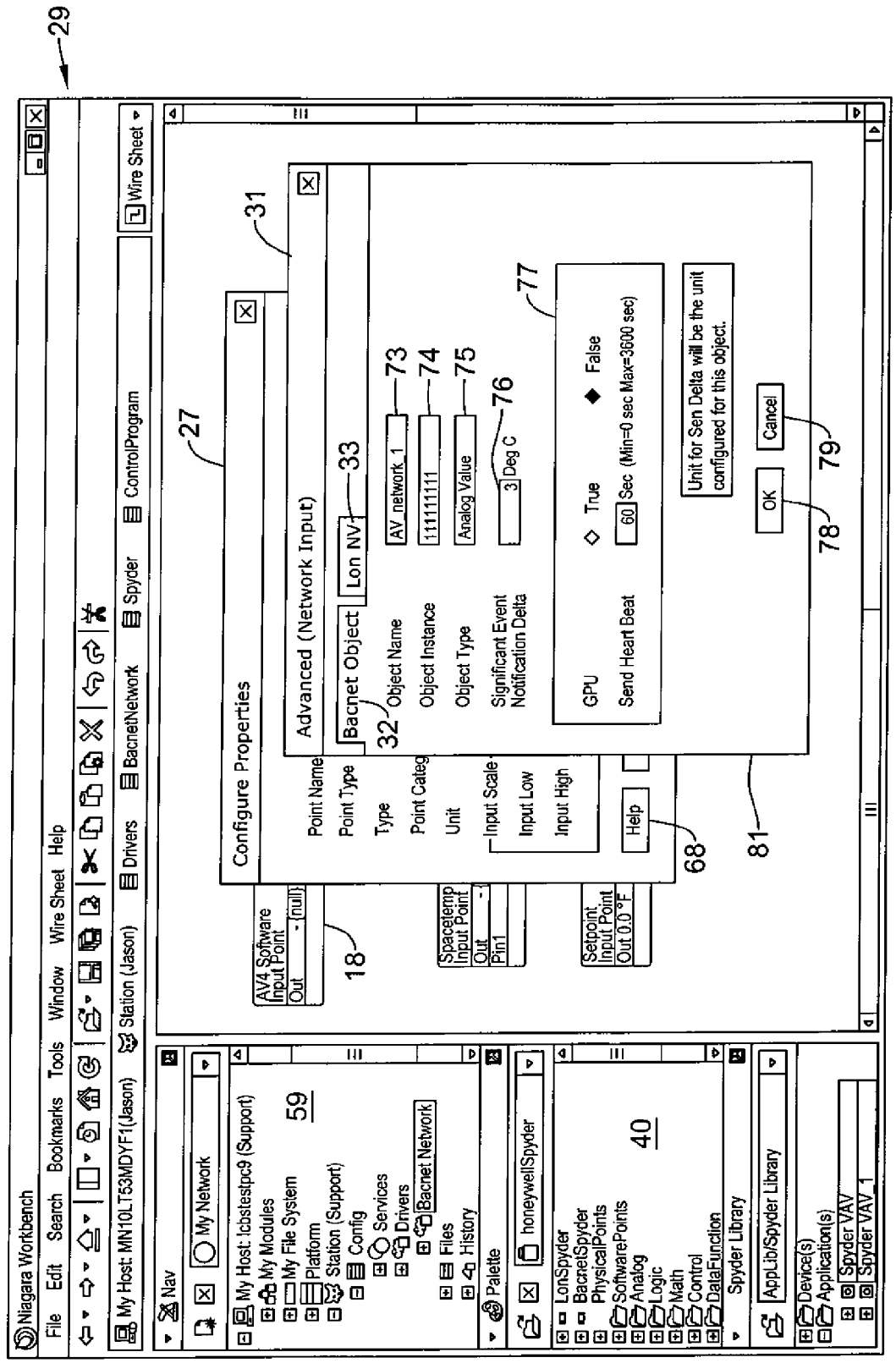
FIG. 5 is a diagram of the workbench for configuring specific properties of a certain protocol.

"Advanced" button 28 of box 27 may be clicked on to get a dialog box or menu 31 to configure network interface specific properties. A fifth step may include configuring BACnet specific properties by selecting the respective tab 32 of dialog box 31 to get a box 81 for selection of the properties, as shown in screen 29 of FIG. 5. These properties may include object name 73, object instance 74, object type 75 and significant event notification delta 76. A box 77 may provide for GPU (guaranteed periodic update) selection and "Send Heart Beat" indication. Selected properties may be accepted by clicking on the "OK" button 78 or rejected by clicking on a "Cancel" button 79.

Figure 6:
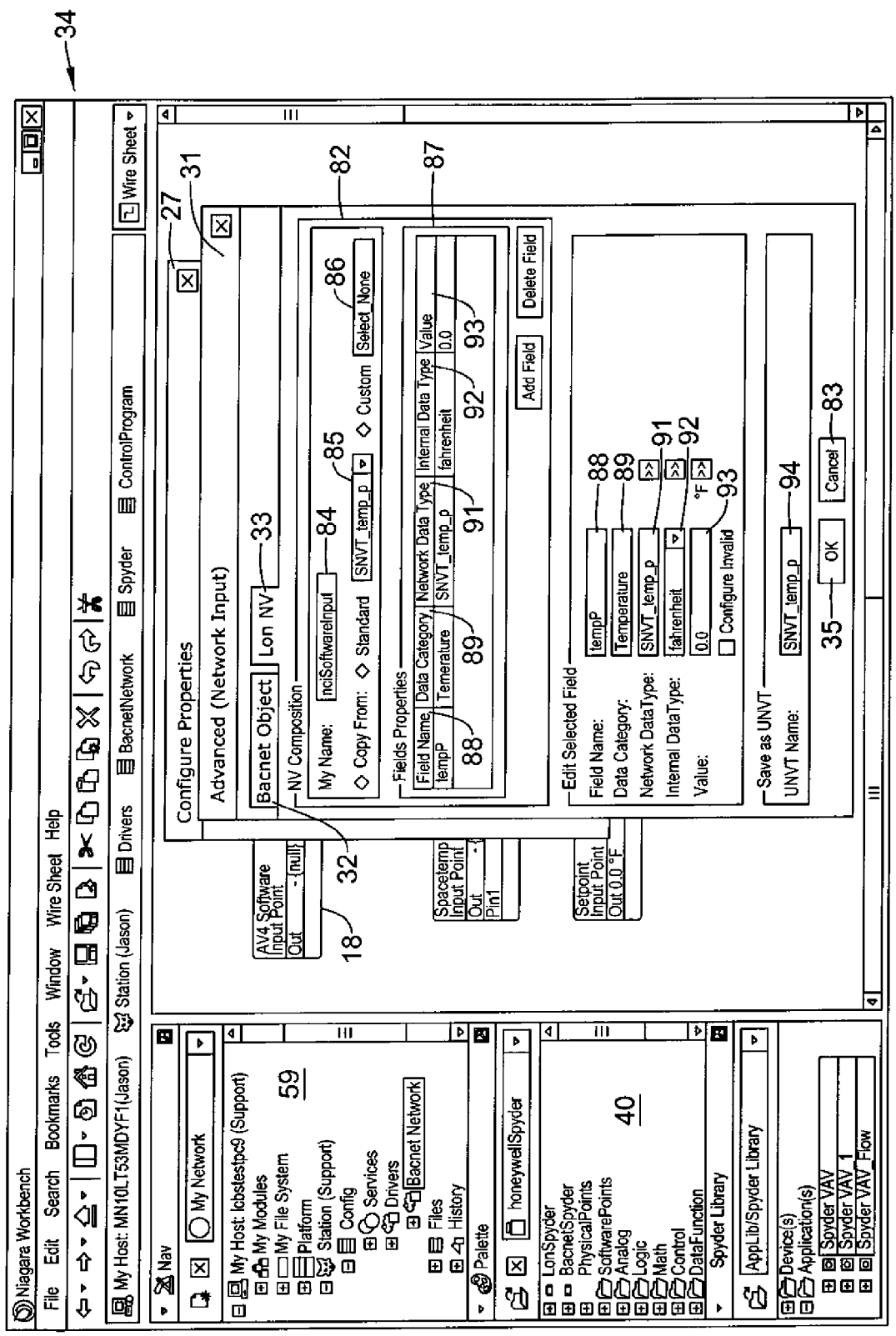
FIG. 6 is a diagram of the workbench for configuring specific properties of a another protocol.

The sixth step may include configuring Lon specific properties by selecting the respective tab 33 of dialog box 31 to get a box 82 for selection of the properties, as shown in screen 34 of FIG. 6. Box 82 indicates NV (network variable) composition with specific properties for Lon. Such properties may include NV name copied from a standard list 85 or a custom selection 86. Field properties 87 may include field name 88, data category 89, network data type 91, internal data type 92 and value 93 may be selected and edited. The selections and edits may be saved under a UNVT (user network variable type) name 94 such as SNVT_temp_p. "SNVT" may be regarded as a standard network variable type. The "OK" button 35 or "Cancel" button 83 may be clicked on to accept the configured specific properties.

Figure 7:
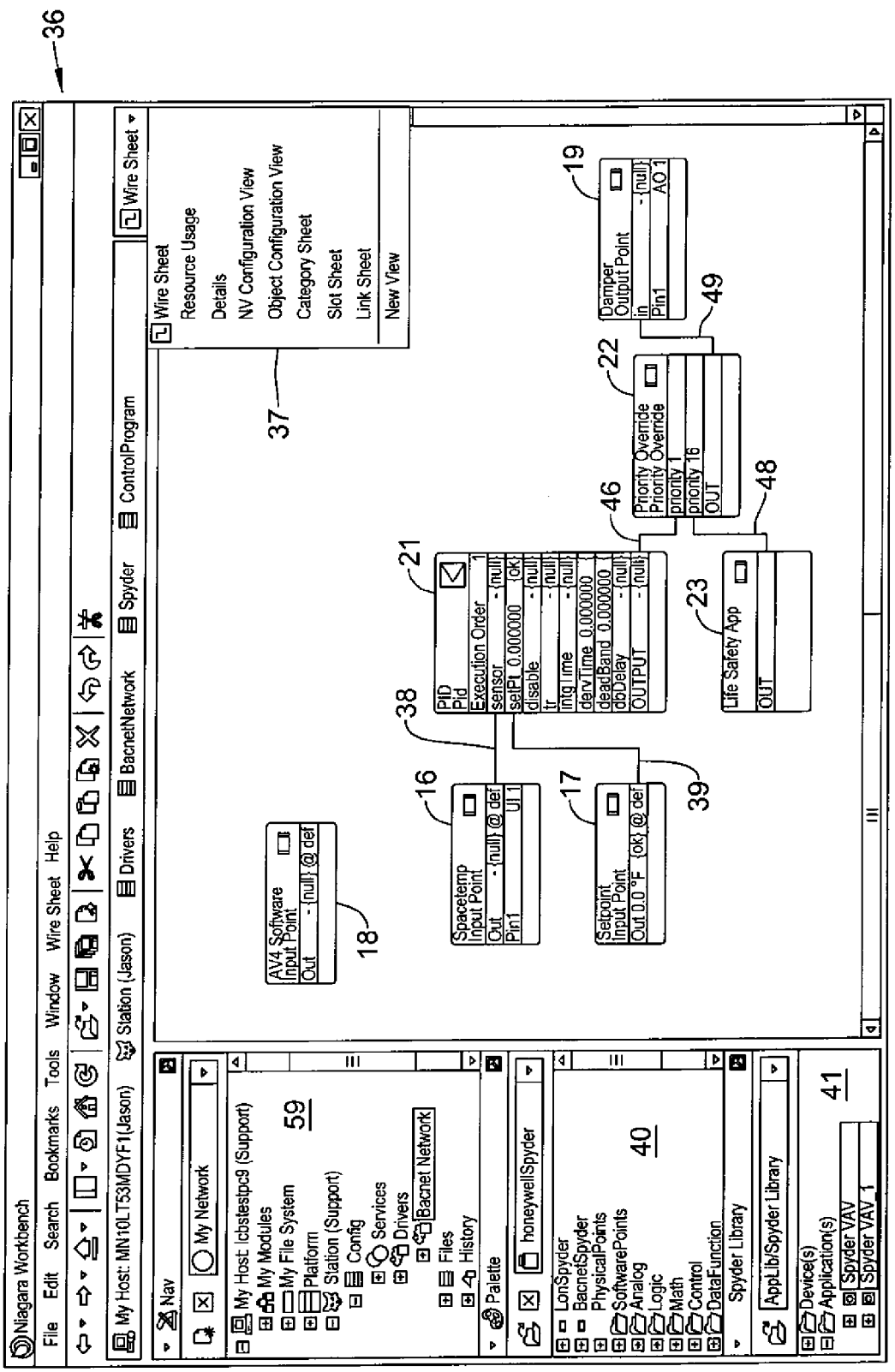
FIG. 7 is a diagram of the workbench for viewing the mapping of a data point to a network interface.

The seventh step may include viewing a mapping of a data point to the network interface by accessing corresponding views as shown by screen 36 of a wiresheet in FIG. 7. Drop down menu 37 may be available for a selection of various views such as a NV configuration view (Lon) or an object configuration view (BACnet).

The Spyder tool may offer a graphical environment to program the Spyder controller. One may use a wiresheet view in the engineering mode (such as an example shown in screen 36 of FIG. 7) to use physical points, software points, and function blocks to build an application in the control program.

The physical points, software points, and function blocks may be accessed using a palette 40. One may drag these items on to the wiresheet and connect them, based on one's need, to develop application logic like that in screen 36. The logic that one creates may then be stored in a Spyder library for reuse. Upon being satisfied with the logic one has created, one may download the same to the controller. The logic thus created may be tested for correctness by selecting simulation and online debugging modes.

One may note that changing NCI (network configuration input) values, configuration of a schedule block, or daylight savings option, puts the application in a quick download pending state. As long as the application has been downloaded at least once to the controller, these changes just trigger a quick download to the controller.

One may use the control program option to program the Spyder tool. To do this, one may expand Lon Spyder or BACnet Spyder in the Nav palette and double-click control program to display the wiresheet view; display the palette (from the menu bar, select Window>Sidebars>Palette to display the palette).

The palette may appear on the left pane with the following items. Lon Spyder is a device that one may drag on to the Lon network in the Nav palette 59 to create a new device. Note that one cannot drop this on to the wiresheet of any macro or control program or application. BACnet Spyder is a device that one may drag on to the BACnet network in the Nav palette 59 to create a new device. It may be noted that one cannot drop this on to the wiresheet of any macro or control program or application. Physical points may be modulating and binary inputs or outputs. Software points may be used to create a network input, network setpoints, or a network output.

Additional items may include analog function blocks, logic function blocks, math function blocks, control function blocks, data-function function blocks, zone arbitration function blocks, and built-in function blocks.

It may be noted that a macro may be a group of functional blocks grouped together that define a specific functionality. Commonly used program elements may be defined as macros so that they could be reused across applications. An application may include macros and logic that one can define and use in applications. Standard applications may be provided for the Spyder used to build application logic.

One may drag any of these noted items on to the wiresheet of a control program in its engineering mode and make the connections between physical points, software points, and function blocks to create a control program or an application.

A wiresheet view may be used to drag the physical points and function blocks to build the application logic. One may save a logic created to be used later and also shared with other users. One may build several applications and store them in a Spyder library along with standard applications.

After one has created the application logic and tested the logic using the simulation feature, the application logic may be downloaded to the controller. To download the application logic, one may: 1) on the Nav palette, right-click the device and select Actions>Download (the download dialog box may appear); and 2) select True under full download for a full download or false for a quick download. One may note that a quick download just downloads the modified items from a previous download where as with a full download the entire configuration may be downloaded to the controller replacing the existing configuration. However, if changes have been made to the sensor bus (SBus) wall module by an operator/tenant locally from the display on the wall module, and a full download is performed, the Spyder tool may download the entire configuration to the controller except the SBus (Sylk or sensor bus) wall module configuration. This may be done to avoid losing any changes made locally on the SBus wall module during a download operation. Then at 3), one may click OK. The application logic may be downloaded to the controller based on one's selection.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for constructing a control logic application for controllers, comprising:
   opening an application library;
   constructing a control logic application in a generic version by a user;
   a library tool automatically saving versions of the control logic application in a plurality of communication protocols supported by the tool,
      the versions of the control logic application in the plurality of communication protocols each including an entirety of the control logic application,
      wherein the control logic application is accessible from the library in the generic version and the versions of the plurality of communication protocols;
   downloading one of the versions of the control logic application in one of the plurality of communication protocols to a controller; and
   the controller executing the downloaded version of the control logic application in the one of the plurality of communication protocols at a time subsequent to the downloading step.

2. The method of claim 1, wherein the plurality of protocols have complexity that is hidden from the user when constructing the control logic application in the generic version.

3. The method of claim 1, wherein:
   the control logic application comprises components being one or more function blocks and data points; and
   as each component is added to the control logic application, the tool maintains a reference of the component in each of the plurality of protocols.

4. The method of claim 3, further comprising:
   for each component, invoking a configuration screen for the component;
   configuring general properties of the component;
   configuring specific properties of the component for a first protocol for a network interface; and
   configuring specific properties of the component for a second protocol for the network interface.

5. The method of claim 4, further comprising viewing a mapping of the components to the network interface.

6. The method of claim 5, wherein the viewing is of a first protocol view.

7. The method of claim 5, wherein the viewing is of a second protocol view.

8. The method of claim 5, wherein the viewing is of a wiresheet.

9. The method of claim 4, further comprising configuring specific properties for one or more additional protocols for a network interface.

10. The method of claim 4, wherein:
    the first protocol is BACnet; and
    the second protocol is LonWorks.

11. The method of claim 4, wherein the invoking a configuration screen of the component, the configuring general properties of the component, the configuring specific properties for a first protocol for a network interface, and the configuring specific properties for a second protocol for the network interface occur automatically while constructing the control logic application comprising components.

12. A method for obtaining an application, comprising:
    constructing a control logic application in a generic version by a user, the control logic application in the generic version comprising function blocks and data points;
    providing a tool that automatically generates and saves versions of the control logic application in a plurality of communication protocols,
       each version of the control logic application including protocol interfaces that are automatically generated upon the constructing of the control logic application in the generic version,
       the versions of the control logic application in the plurality of communication protocols each including an entirety of the control logic application;
    downloading one of the versions of the control logic application in one of the plurality of communication protocols to a controller; and
    executing by the controller, the downloaded version of the control logic application in the one of the plurality of communication protocols at a time subsequent to the downloading step.

13. The method of claim 12, wherein as data points are added to a wiresheet, the tool automatically provides corresponding backend entities of each protocol for the data points.

14. The method of claim 13, wherein since changes to the control logic application in the generic version are reflected in the protocol versions of the control logic application, the control logic application need not be replicated by the user for the protocol versions.

15. The method of claim 12, wherein when a data point is dropped in the control logic application, the tool automatically creates an underlying protocol entity and maintains a mapping or reference between the data point and the protocol entity.

16. The method of claim 15, wherein:
    the plurality of communication protocols comprise LonWorks and BACnet protocols;
    the LonWorks and BACnet protocols are supported by the tool;
    the tool maintains a mapping or reference for each protocol supported;
    the tool maintains at least two mappings or references for each data point dropped into the control logic application; and
    the tool does an automatic translation for each protocol when the control logic application is used in a compatible controller.

17. The method of claim 15, wherein the translation for each protocol is hidden from the user when constructing a control logic application in a generic version.

18. A non-transitory computer-readable medium containing instructions which, when executed by a computer, provide a system for creating a control application in both generic and a plurality of protocol-specific formats, comprising:
    an application library;
    control logic constructed from data points and function blocks;

a configuration menu for each data point;
a first dialog box for configuring general properties of each data point;
a second dialog box for configuring network interface specific properties for each protocol used; and
a map of each data point to a network interface with a corresponding view for each protocol;
a tool configured to automatically generate protocol interfaces for the control logic, wherein when a data point is dropped in the control logic, the tool automatically provides an underlying protocol entity for each protocol used and maintains a mapping or reference between the data point and the protocol entity for each protocol used;
a downloader configured to download an entirety of the control logic in one of the protocol-specific formats to an HVAC controller; and
the controller executing the downloaded version of the control logic application in the one of the plurality of protocol-specific formats at a time subsequent to the downloading by the downloader.

* * * * *